US010783716B2

(12) United States Patent
Yumer

(10) Patent No.: US 10,783,716 B2
(45) Date of Patent: Sep. 22, 2020

(54) THREE DIMENSIONAL FACIAL EXPRESSION GENERATION

(71) Applicant: Adobe Inc., San Jose, CA (US)

(72) Inventor: Mehmet Ersin Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 641 days.

(21) Appl. No.: 15/059,067

(22) Filed: Mar. 2, 2016

(65) Prior Publication Data

US 2017/0256098 A1 Sep. 7, 2017

(51) Int. Cl.
*G06T 13/40* (2011.01)
*G06T 19/20* (2011.01)

(52) U.S. Cl.
CPC .............. *G06T 19/20* (2013.01); *G06T 13/40* (2013.01); *G06T 2219/2004* (2013.01); *G06T 2219/2021* (2013.01)

(58) Field of Classification Search
CPC ..................................................... G06T 13/40
USPC ......................................................... 345/473
See application file for complete search history.

(56) References Cited

U.S. PATENT DOCUMENTS

| 2006/0188144 | A1* | 8/2006 | Sasaki | G06K 9/00281 |
| | | | | 382/154 |
| 2010/0141679 | A1* | 6/2010 | Lee | G06T 13/40 |
| | | | | 345/634 |
| 2010/0259538 | A1* | 10/2010 | Park | G06T 13/40 |
| | | | | 345/419 |
| 2013/0121409 | A1* | 5/2013 | Bourdev | G06K 9/00208 |
| | | | | 375/240.08 |
| 2014/0160123 | A1* | 6/2014 | Yang | G06T 17/00 |
| | | | | 345/420 |

OTHER PUBLICATIONS

Baran,"Semantic Deformation Transfer", SIGGRAPH 2009, Jul. 27, 2009, 6 pages.
Bickel,"Pose-Space Animation and Transfer of Facial Details", Eurographics/ ACM SIGGRAPH Symposium on Computer Animation (2008), Jul. 7, 2008, 10 pages.
Deng,"Animating Blendshape Faces by Cross-Mapping Motion Capture Data", To appear in the Proc. of ACM SIGGRAPH Symposium on Interactive 3D Graphics and Games, Mar. 2006, 7 pages.
Lewis,"Practice and Theory of Blendshape Facial Models", EUROGRAPHICS 2014/ S. Lefebvre and M. Spagnuolo, 2014, 20 pages.
Sumner,"Deformation Transfer for Triangle Meshes", ACM Transactions on Graphics (TOG); v. 23, n. 3, Aug. 2004, 7 pages.

\* cited by examiner

*Primary Examiner* — Yi Yang

(74) *Attorney, Agent, or Firm* — SMBC

(57) ABSTRACT

A digital medium environment is described to generate a three dimensional facial expression from a blend shape and a facial expression source. A semantic type is detected that defines a facial expression of the blend shape. Transfer intensities are assigned based on the detected semantic type to the blend shape and the facial expression source, respectively, for individual portions of the three dimensional facial expression, the transfer intensities specifying weights given to the blend shape and the facial expression source, respectively, for the individual portions of the three dimensional facial expression. The three dimensional facial expression is generated from the blend shape and the facial expression source based on the assigned transfer intensities.

20 Claims, 10 Drawing Sheets

THREE DIMENSIONAL FACIAL EXPRESSION GENERATION

BACKGROUND

Realistic three dimensional facial expressions are one of the greatest challenges in digital content animation. One technique used to generate these 3D facial expressions is through the use of blend shapes. An artist, for instance, may generate a three dimensional facial expression (e.g., using 3D modeling tools such as meshes and polygons) that is to serve as a source, and thus is referred to as a facial expression source in the following. Blend shapes are then used, which include 3D models of different facial expressions, to generate other facial expressions from the facial expression source by transferring an appearance of the facial expression source to the blend shapes.

For example, the facial expression source may include a neutral facial expression of a man. The facial expression source may then be used with different blend shapes to generate different facial expressions of the man, e.g., happy, sad, surprised, angry, smirking, and so forth. In this way, the blend shapes may increase efficiency in generation of the different facial expressions, thereby conserving an artist's time, may be used by users without specialized knowledge, and so on.

However, conventional techniques used to generate facial expressions that rely on blend shapes typically lack accuracy and thus do not look realistic. In one such conventional example, this is because the conventional technique directly calculates a positional difference for each point between a blend shape and the source. The calculated difference is then applied to the source, and the result is used as the 3D facial expression. In another conventional example, a mesh deformation transfer technique is employed in which the blend shape is used as one of the models to deform a model of the source to arrive at the 3D facial expression. Both of these examples, however, are optimized for global transfer and thus are employed linearly for each of the points used to form the 3D facial expression. Because facial expressions typically do not exhibit linear movement of each portion of the face when changing expressions, this may result in unrealistic movements and expressions such as half-open eyes when the blend shape specifies closed eyes, facial creases, and so forth.

SUMMARY

Three dimensional facial expression generation techniques and systems are described. These techniques support non-linear transfer of an appearance of a facial expression source to a blend shape to form a three dimensional facial expression. To do so, these techniques detect a semantic type of a blend shape to be used to generate the expression. Examples of semantic types include smiling, yawning, grinning, angry, and so forth that may be detected based on modeled parts of the expression.

The semantic type is then used to assign transfer intensities (e.g., weights) to corresponding points of the blend shape and the facial expression source to generate the three dimensional facial expression. For example, for points exhibiting a greater amount of movement (e.g., to transition from a closed mouth to a smiling mouth) greater weight is given to the blend shape than the facial expression source. For points exhibiting a lesser amount of movement (e.g., the eyes remain open in both the source and the blend shape), greater weight is given to the facial expression source than the blend shape. In this way, semantic integrity is preserved as part of non-linear transfer in which different portions of the three dimensional facial expression may have different transfer intensities. This also promotes realism of the expression by maintaining locality of portions of the facial expression source, e.g., width of nose, eyes, mouth, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
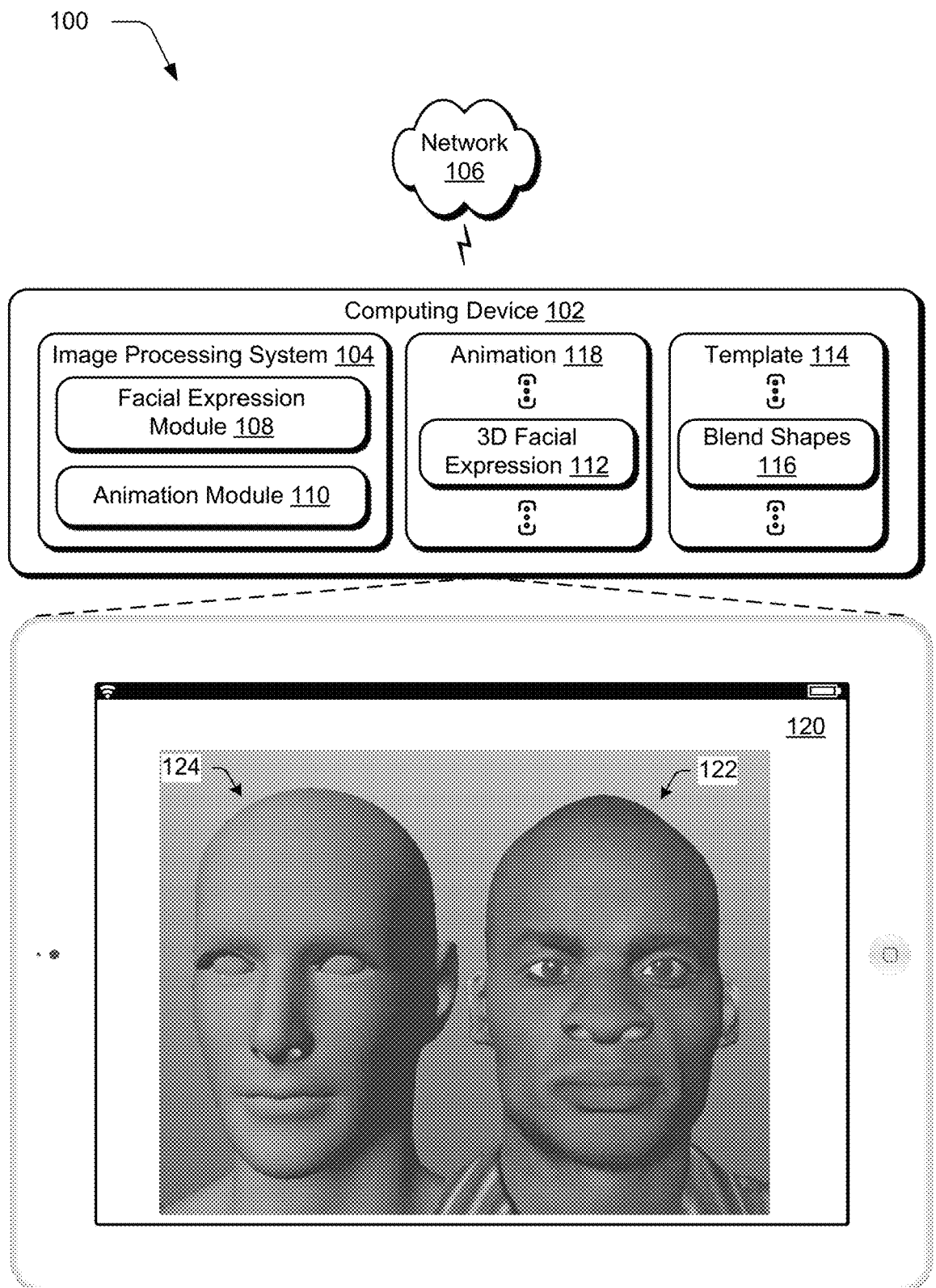
FIG. 1 is an illustration of an environment in an example implementation that is operable to employ three dimensional facial expression generation techniques described herein.

Realistic three dimensional facial expressions are one of the greatest challenges in digital content animation. One technique used to generate a 3D facial expression is through the use of blend shapes in which an appearance of a facial expression source is transferred to a plurality of blend shapes. The blend shapes act as models to generate different three dimensional facial expressions, e.g., smiling, frowning, and so on. However, conventional blend shape techniques rely on global application of linear optimizations as previously described, and as such, may result in artifacts (e.g., facial creases), or unrealistic expressions, e.g., eyes are partially open even in an instance in which the eyes are to be completely closed.

Three dimensional facial expression generation techniques and systems are described. These techniques are configured to take into account a semantic type of a blend shape that is to receive a transfer of appearance from an image source in order to generate the three dimensional facial expression. The semantic type may then be used to assign different transfer intensities to the blend shape and the facial expression source, respectively, to specify an amount of contribution each of these is to have on respective points in forming a three dimensional facial expression.

In one example, a determination is then made as to the semantic type of a blend shape that is to be used to generate the three dimensional facial expression. Examples of semantic types include identification of portions of the face that move with respect to the neutral expression (e.g., jaw-related) and semantic types corresponding to general feelings that also have corresponding identified portions, e.g., surprise by uplifted eyebrows and open mouth.

The semantic type is then used to specify respective weights given to a facial expression source and the blend shape to corresponding points in generating the three dimensional facial expression. Continuing with the previous example, a facial expression source having a neutral expression of a man is compared with a blend shape to determine a semantic type of "smiling," through detection of movement of points relating to a mouth in the blend shape. This movement, and the corresponding semantic type, is then used to give greater weight to the blend shape than the facial expression source for the mouth and thus different amounts of a "transfer intensity" to the blend shape and the facial expression source. The reverse is applied to other portions that exhibit less movement by giving greater weight to the facial expression source than the blend shape, e.g., for the eyes, forehead, and other parts that stay relatively constant.

In this way, semantic integrity of the three dimensional facial expression is promoted by ensuring that the smile is realized and yet promotes realism through greater weights to the facial expression source for non-moving parts. Consequently, non-linear transfer intensities may be used that vary from one point to another to describe different contribution amounts from the facial expression source and blend shape, which is not possible using conventional linear and global approaches. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation operable to employ image selection control techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The computing device 102 is illustrated as including an image processing system 104. The image processing system 104 is implemented at least partially in hardware of the computing device 102 to create, transform, edit, and manage images as digital content as part of the digital medium environment 100. Although illustrated as implemented locally on the computing device 102, the image processing system 104 may also be implemented, in whole or in part, "in the cloud" via the network 106, e.g., as a web service.

Examples of functionality that are implemented by the image processing system 104 include a facial expression module 108 and an animation module 110. The facial expression module 108 is implemented at least partially in hardware (e.g., a processing system, computer-readable storage media, integrated circuits) to generate a three dimensional (3D) facial expression 112. To do so, the facial expression module 108 employs a template 114 having a plurality of blend shapes 116, e.g., thirty to fifty blend shapes. These blend shapes 116 serve as models of respective ones of a plurality of facial expressions be used to generate respective three dimensional facial expressions 112. The 3D facial expressions 112 may be employed to support a variety of functionality. In one example, the 3D facial expressions 112 are configured as frames in an animation 118 generated by the animation module 110 to be rendered for viewing on a display device 120. Other examples are also contemplated, such as to render a single two-dimensional image as a desired view of the 3D facial expression 112.

In order to generate the 3D facial expression 122, the facial expression module 108 employs a facial expression source 122. The facial expression source 122, for instance, may be configured as a three dimensional model 124, over which, a texture is applied. In another example, the facial expression source 122 is configured as a two-dimensional image having a texture that is then converted to include a three dimensional model 124 by the facial expression module 108. This conversion is performable in a variety of ways, such as texture mapping. Thus, in this example the three dimensional model 124 defines a structure of the facial expression source 124 with the two-dimensional image supplying a texture of the facial expression source 122. An example of generation of the 3D facial expression 122 from the blend shapes 116 and the facial expression source 122 is further described in the following.

Figure 2:
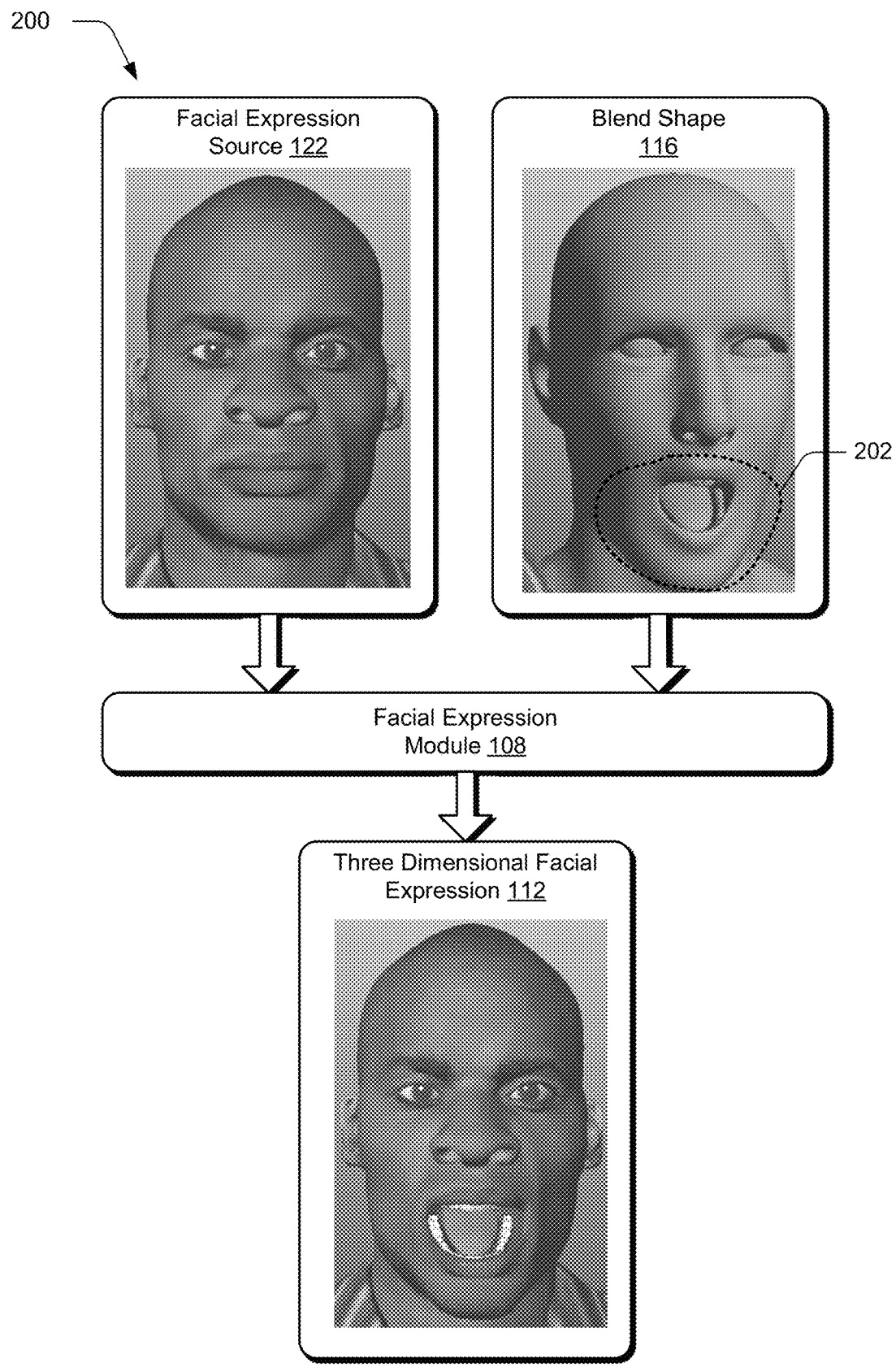
FIG. 2 depicts a system in an example implementation showing operation of the facial expression module 108 of FIG. 1 in greater detail.

FIG. 2 depicts a system 200 in an example implementation showing operation of the facial expression module 108 of FIG. 1 in greater detail. In this example, the facial expression module 108 receives as inputs a facial expression source 122 and a blend shape 116. As previously described, the facial expression source 122 includes an appearance defined by a texture and underlying model 124 to be transferred to the blend shape 116 to form the three dimensional facial expression 112.

The facial expression module 108 is configured to overcome limitations of conventional linear and global transfer techniques by supporting non-linear transfer. The facial expression module 108, for instance, may specify different transfer intensities to be used for different portions of the facial expression source 122 and the blend shape 116 to specify different weights given to those portions in order to define a respective amount of contribution in forming the three dimensional facial expression 112 for these portions.

In order to define these different transfer intensities, the facial expression module 108 determines a semantic type of the blend shape 116. The semantic type, for instance, may be used to define a relative importance of different portions of the blend shape 116 in defining a respective facial expression. In the illustrated example, the facial expression module 108 determines that the blend shape 116 has a semantic type that is jaw-related 202, e.g., an open mouth. Accordingly, in generating the three dimensional facial expression 112 greater weight is given to the jaw-related 202 portion of the blend shape 116 than a jaw-related portion of the facial expression source 122. Areas outside the jaw-related 202 portion of the blend shape 116 in the blend shape 116 have relative less importance in this example in exhibiting the facial expression. As such, portions of the facial expression source 122 outside the jaw-related 202 portion of the facial expression source 122 are given greater weight than those corresponding portions of the blend shape 116 in generating the three dimensional facial expression 112.

In this way, portions of the three dimensional facial expression 112 may have non-linear contributions, one to another, from the facial expression source 122, and blend shape 116. This supports preservation of semantic integrity of the blend shape 116 (e.g., the mouth is fully opened in this example) while preserving a realistic transfer of appearance from the facial expression source.

Figure 3:
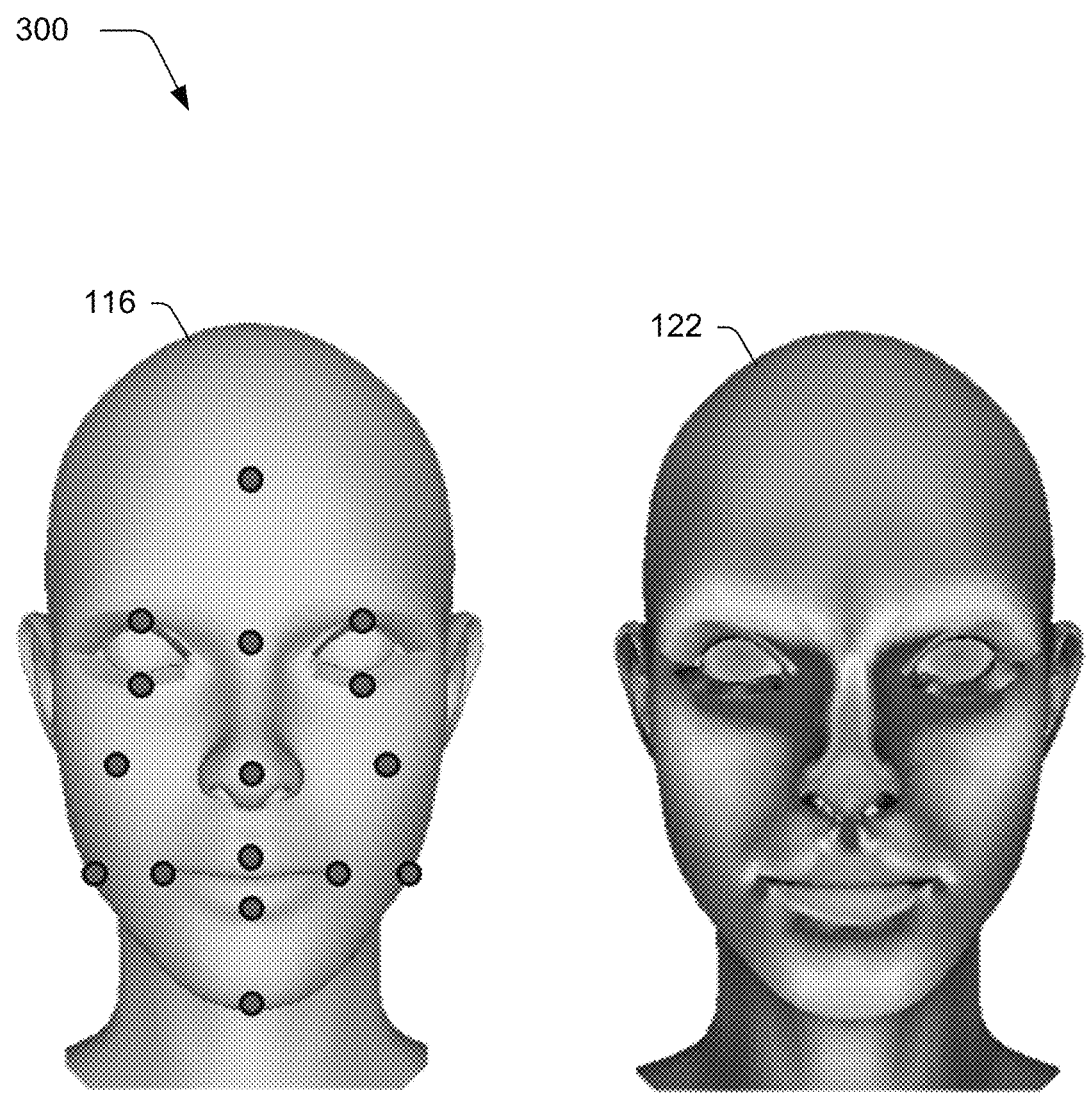
FIG. 3 depicts preservation of global semantics using a blend shape and local geometry using a facial recognition source.

As shown in an example implementation 300 of FIG. 3, for instance, this is used to preserve global semantics of the blend shape 116 and preserve local geometry defined by the facial expression source 122. For example, the different transfer intensities may be used to ensure semantic integrity of movement specified by the blend shape 116 from an underlying model 124 of the facial expression source 122. This includes ensuring that the eyes are fully open or closed as specified, mouth open, and so forth. Additionally, this also preserves local geometry of features of the facial expression source 122, such as size and shape of different portions of a face including eyes, lips, mouth, ears, chin, forehead, and so forth.

Figure 4:
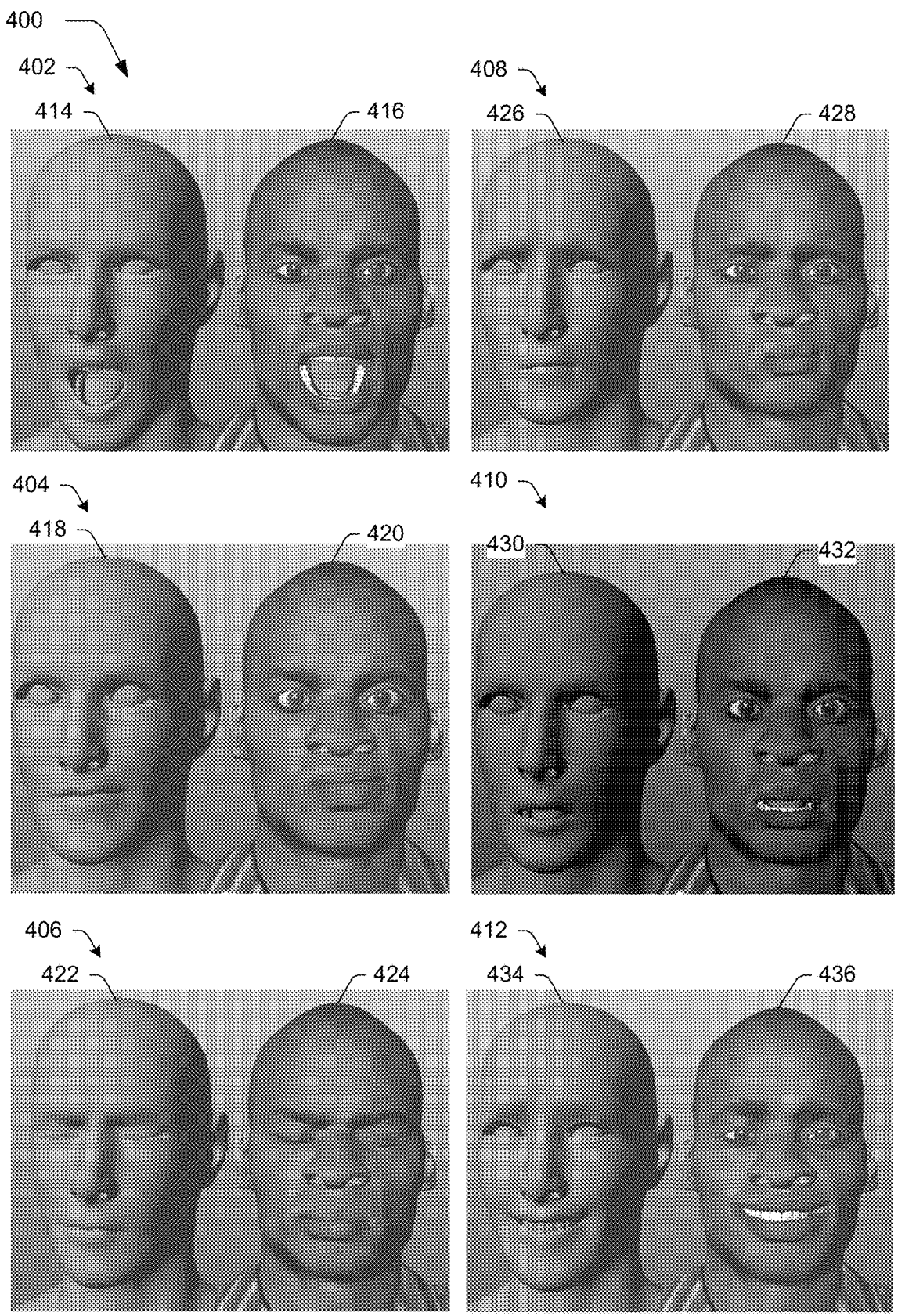
FIG. 4 includes additional examples of generation of three dimensional facial expressions from a facial expression source of FIG. 2.

FIG. 4 includes additional examples 400 of three dimensional facial expression generation from the facial expression source 122 of FIG. 2. In the following examples, detection of a semantic type of the blend shape is performed in a variety of ways. Examples of detection include facial recognition, comparison of the blend shape with an underlying model 124 of the facial expression source 122 to detect movement of facial portions and thus a semantic type based on those portions (e.g., jaw-related), and so forth.

First, second, third, fourth, fifth, and sixth examples 402, 404, 406, 408, 410, 412 are illustrated. In the first example 402, a blend shape 414 is determined to have a semantic type of jaw-related, e.g., a mouth is open, through comparison of the blend shape 414 with the model 124 of the facial expression source 122. Accordingly, the three dimensional expression 420 is formed by giving greater weight to the blend shape 414 for the jaw with greater weight given to the facial expression source 122 for other portions of the three dimensional expression 416. This maintains a consistent and realistic look to the eyes, nose, and forehead and still promotes semantic integrity of the jaw being fully open.

In the second example 404, a semantic type of the blend shape 414 is determined by the facial expression module 108 as a smirk that is both jaw and left cheek related and includes wide open eyes. Accordingly, increased weights for the jaw, left check and eyes are specified for the blend shape 418 and increased weights to the facial expression source 122 are specified elsewhere.

In the third example 406, a semantic type is determined by the facial expression module 108 as a grimace for blend shape 422. The semantic type of grimace includes characteristics such as eyes closed, wrinkled nose, and closed lips, e.g., through a lookup by the facial expression module 108 once identified using facial recognition. Accordingly, the three dimensional expression 424 is formed by giving greater weight to the blend shape 422 for these portions. Other portions of the three dimensional expression 424 give greater weight to the facial expression source 122 for generating the three dimensional expression 424.

Similar use of weights and transfer intensities are observable in the fourth, fifth, and sixth examples 408, 410, 412 in the following. In the fourth example 408, the blend shape 426 has a semantic type of "questioning" by the facial expression module 108 to form the three dimensional expression 428. Accordingly, corresponding portions of the blend shape 426 are given greater weight that exhibit movement when compared to the underlying model 124 of the facial expression source 122. In the fifth example 410, the blend shape 430 has a semantic type of "surprise" through comparison the facial expression module 108. Thus, corresponding portions of the blend shape 430 are given greater weight to that exhibit movement when compared to the underlying model 124 of the facial expression source 122 to generate the three dimensional expression 432.

Likewise, in the sixth example 412 the blend shape 434 is determined to have a semantic type of "smiling" by the facial expression module 108 to generate the three dimensional expression 436. Corresponding portions of the blend shape 434 are also given greater weight that exhibit movement when compared to the underlying model 124 of the facial expression source 122. A variety of other examples are also contemplated, further discussion of which is included in the following description and shown using corresponding figures.

Figure 5:
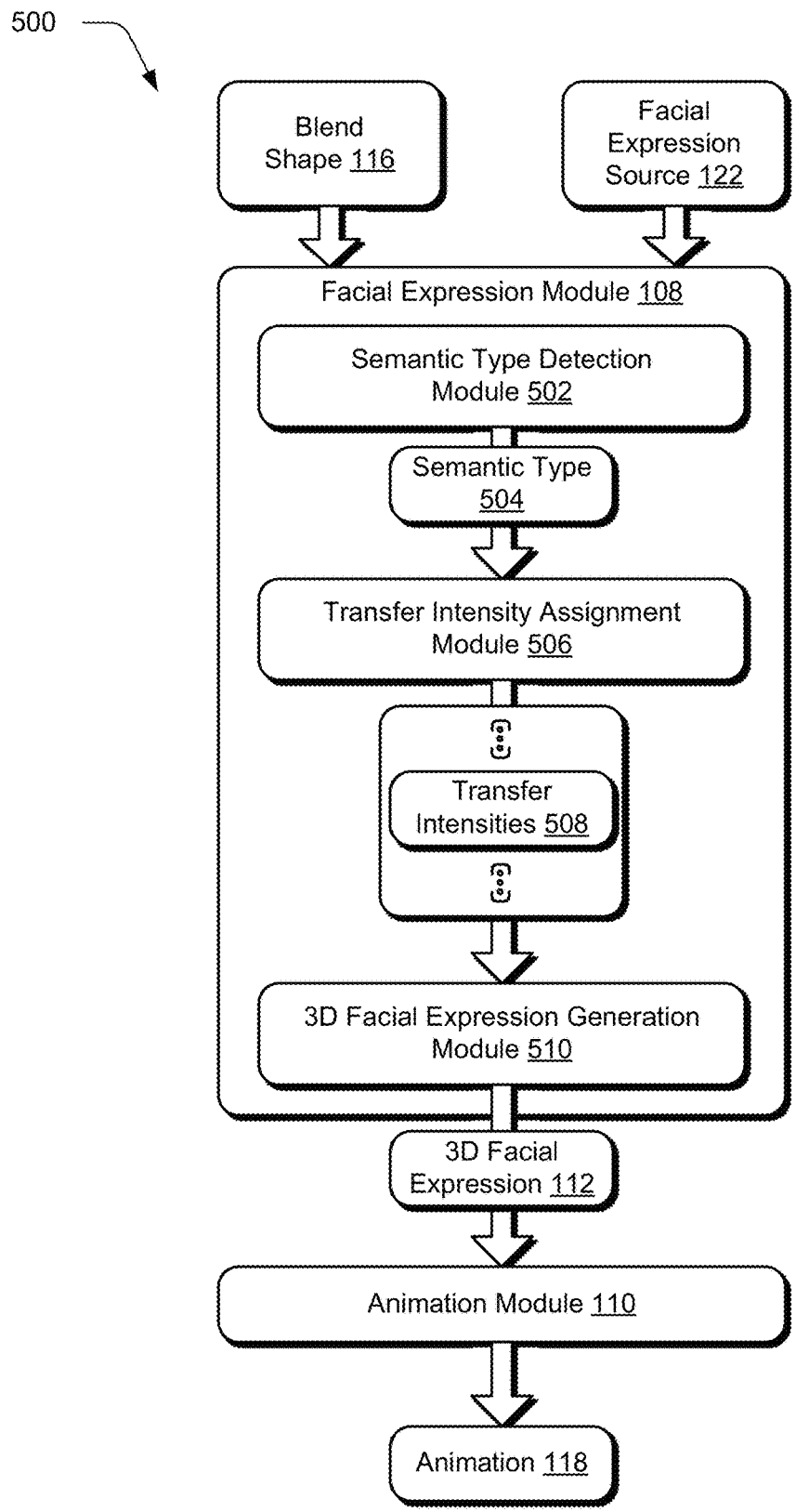
FIG. 5 depicts a system showing an additional example of operation of the facial expression module in greater detail.
Figure 6:
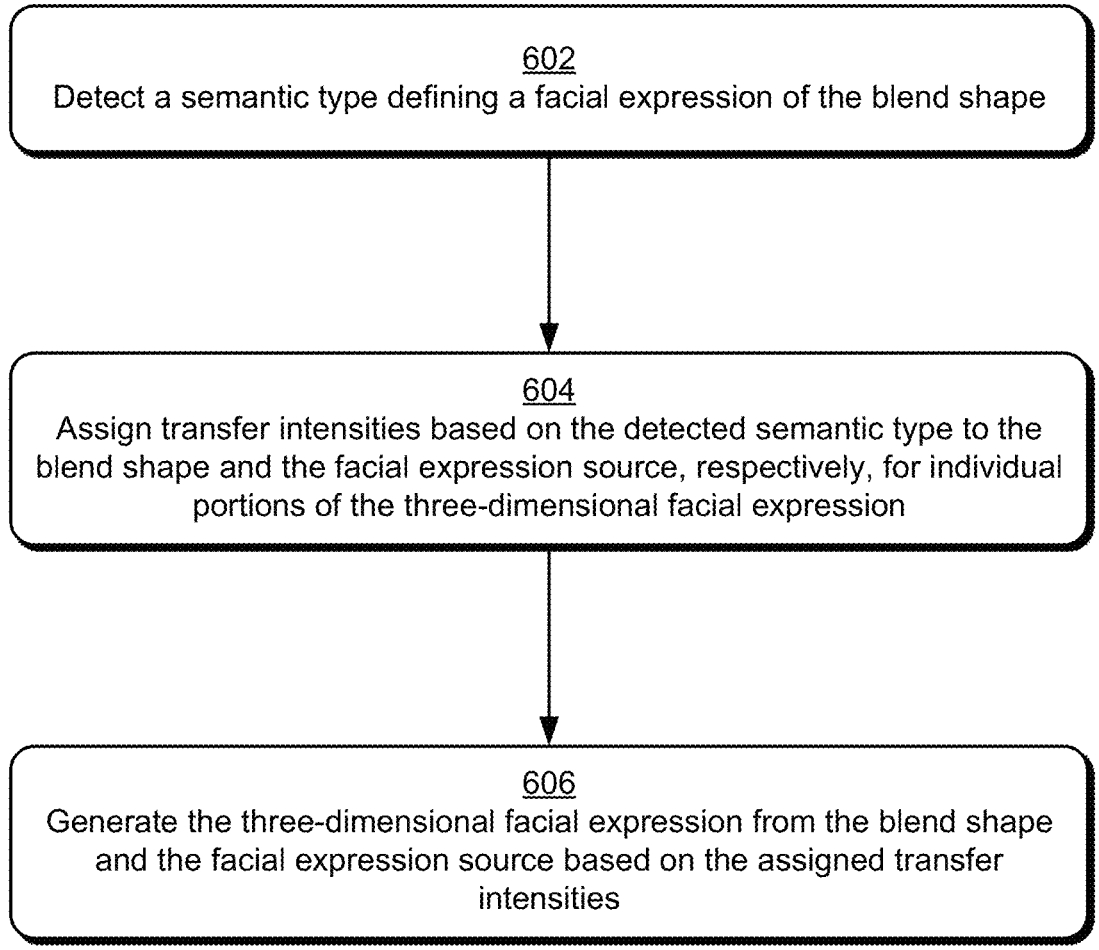
FIG. 6 is a flow diagram depicting a procedure in an example implementation in which a three dimensional facial expression is generated from a blend shape and a facial expression source.

FIG. 5 depicts a system 500 showing an additional example of operation of the facial expression module 108 in greater detail. FIG. 6 depicts a procedure 600 in an example implementation in which a three dimensional facial expression is generated from a blend shape 116 and a facial expression source 122. In the following, the discussion interchangeably refers to both figures.

Aspects of the procedure may be implemented in hardware, firmware, software, or a combination thereof. The procedure is shown as a set of blocks that specify operations performed by one or more devices as further described in relation to FIG. 10 and are not necessarily limited to the orders shown for performing the operations by the respective blocks.

A blend shape 116 and a facial expression source 122 are received by the facial expression module 108 to generate a three dimensional facial expression 112. A semantic type detection module 502 is then employed, which is implemented at least partially in hardware to detect a semantic type 504 defining a facial expression of the blend shape 116 (block 602). As previously described in relation to FIG. 4, the semantic type 504 is detectable in a variety of ways from the blend shape 116. In one example, facial recognition techniques are used to determine a semantic type of a facial expression, e.g., smiling, frowning, etc. A lookup is then performed by the semantic type detection module 502 to determine which portions of a face are involved in this semantic type. These portions are then used as a basis to assign transfer intensities 508 as further described in the following.

In another example, the semantic type detection module 502 compares the blend shape 116 with the underlying model 124 (e.g., shape) of the facial expression source 122 to determine which parts of the blend shape 116 have moved in relation the model 124. This may be used, for instance, to detect semantic types based on part of the face used to make the facial expression, such as jaw related, eye related, mouth related, chin related, eyebrow related, hair related, ear related, and so forth. These semantic types 504 may then be used as a basis to determine which parts of the blend shape 116 and the facial expression source 122 are to be given respective amounts of weight in forming the 3D facial expression.

Transfer intensities are assigned based on the detected semantic type to the blend shape and the facial expression source, respectively, for individual portions of the three dimensional facial expression (block 604). The semantic type 504, for instance, is illustrated as being input to a transfer intensity assignment module 506. The transfer intensity assignment module 506 is implemented at least partially in hardware to assign corresponding transfer intensities 508 to portions of the blend shape 116 and the facial expression source 122, respectively. The transfer intensities 508, for instance, specify respective weights given to the blend shape and the facial expression source for individual points (e.g., pixels) of the three dimensional facial expression 112.

Continuing with the previous example, a semantic type 504 may be indicative of intrinsic portions of a face that are involved in defining a corresponding facial expression, e.g., mouth for smiling, eyebrows for frowning, and so forth. Thus, the semantic type 504 may be detected by movement of portions of the blend shape 116 through comparison with the model 124 of the facial expression source 122, e.g., when the model expresses a neutral expression, through comparison of the source and the blend shape 116 to determine which parts differ and thus have moved. In another example, facial recognition of the blend shape 116 is used to determine whether the shape is smiling, angry, and so forth. A lookup is then performed to determine which portions of the face are involved in this expression. For example, the type of blend shape may be determined through comparison with a database of known blend shape models using markers, such as those shown in FIG. 3, e.g., to determine blinking, smiling, and so forth.

For each of the portions that are involved in the expression of the blend shape 116 (i.e., give its semantic type), the transfer intensity assignment module 506 is configured to assign a greater transfer intensity 508 to the blend shape 116 (i.e., a greater weight) than a transfer intensity 508 assigned to the facial expression source 122. For example, the weights (whether to transfer from the source to preserve what is locally available on the three dimensional facial expression or to achieve an expression in a blend shape) may be determined through an optimization technique. In this technique, the optimization is performed to ensure (1) the semantic type determine above is matched in the three dimensional facial expression (e.g., to ensure eyes are closed when blinking); and (2) local surface quality given by local properties of the source. Given these two constraints, the optimization attempts to maximize the amount of transfer from the source to the three dimensional facial expression. In this way, semantic integrity of a goal of the three dimensional facial expression 112 as specified by the blend shape 116 is preserved and thus may prevent against unintentionally formed half-open eyes and facial creases that are observed in conventional techniques. Local geometries are also preserved by assigning a greater transfer intensity to the facial expression source 122 than the blend shape 116 for other portions.

The three dimensional facial expression is then generated from the blend shape and the facial expression source based on the assigned transfer intensities (block 606). The transfer intensities 508, for instance, are provided to a 3D facial expression generation module 510 that is implemented at least partially in hardware to generate the 3D facial expression 112 from the blend shape 116 and the facial expression source 122. This generation is based on the assigned transfer intensities 508 such that different portions of the 3D facial expression 112 are influenced by different combinations of respective portions of the blend shape 116 and the facial expression source 122. In this way, the transfer intensities 508 may be applied to the 3D facial expression to use non-linear combinations of the blend shape 116 and the facial expressions source 122 once for different portions of the same 3D facial expression 112. This procedure 600 may be repeated for a plurality of blend shapes 116 of a template 114, e.g., such that the corresponding 3D facial expressions 112 are readily available to a user in real time when requested when output as part of an animation.

The 3D facial expression 112 may be used to support a variety of functionality. An example of this is illustrated as an animation module 110 in which the 3D facial expression 112 is used as one of a plurality of frames in sequence to form the animation 118. For example, the facial expression source 122 may be configured as one frame of the animation and the 3D facial expression 112 formed from the source 122 and the blend shape 116 as another. Blending techniques (e.g., interpolation) may be used to form frames disposed inbetween by blending the facial expression source 122 with the 3D facial expression 112. A variety of other examples are also contemplated, such as to generate a desired two-dimensional image from the 3D facial expression 112.

Figure 7:
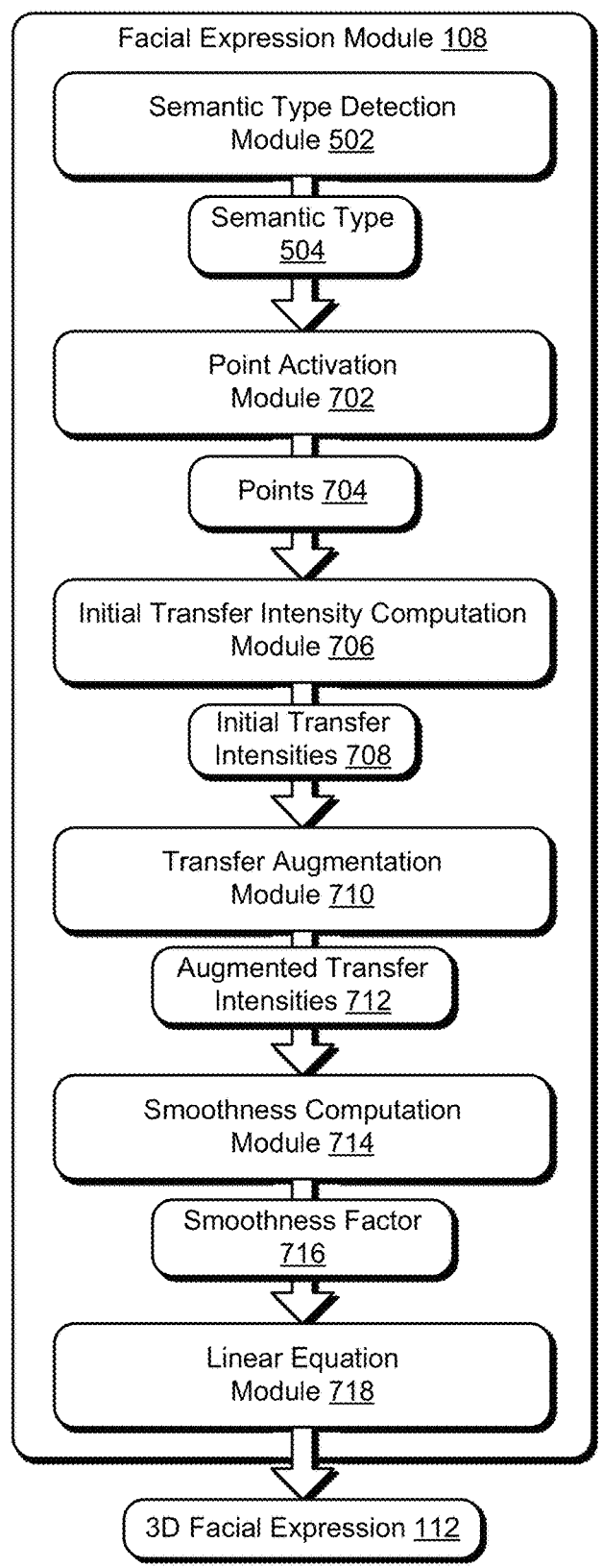
FIG. 7 depicts a system showing an additional example of operation of a facial expression module in greater detail.
Figure 8:
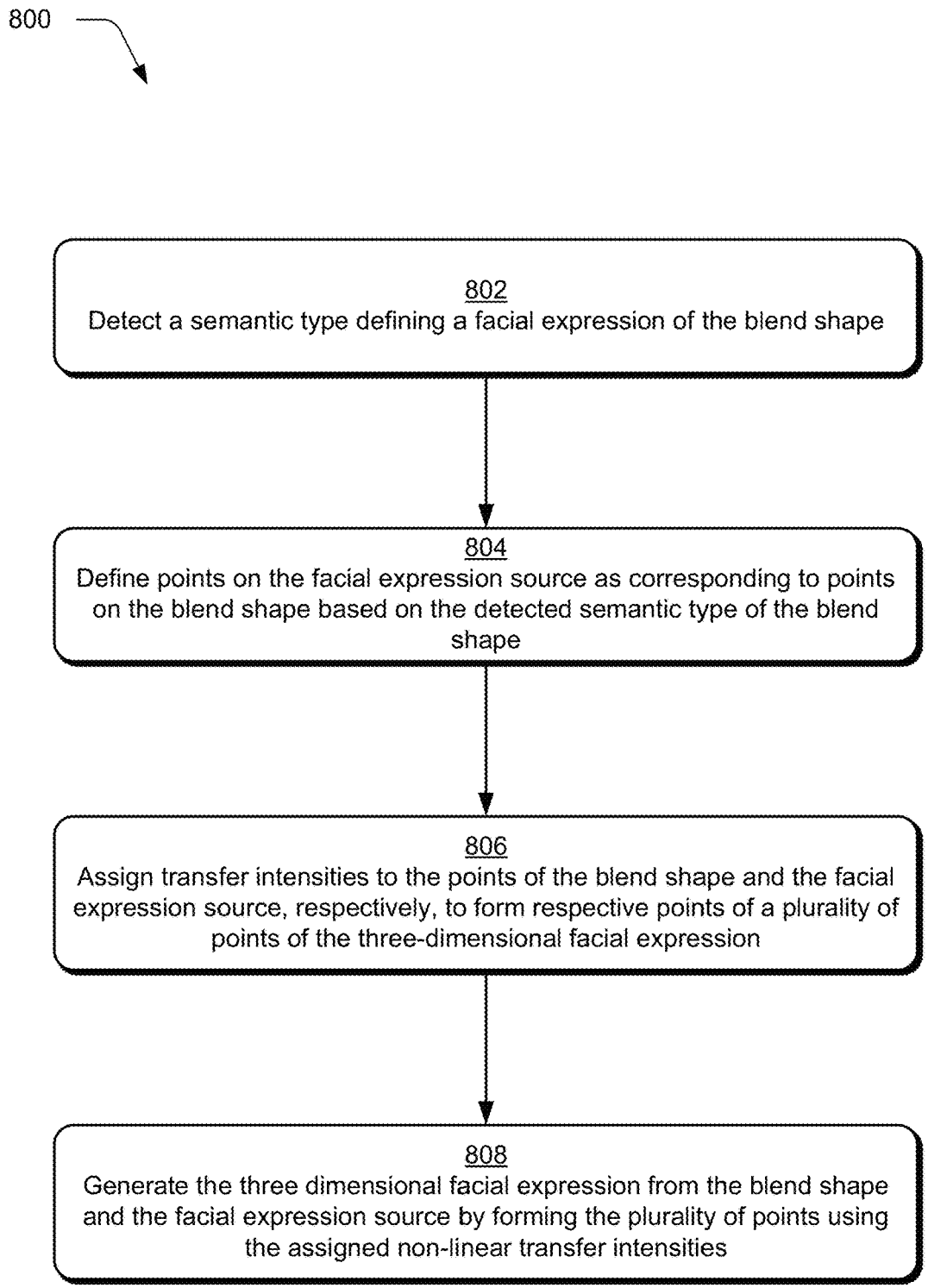
FIG. 8 is a flow diagram depicting a procedure in another example implementation in which a three dimensional facial expression is generated using a nonlinear technique from a blend shape and a facial expression source.

FIG. 7 depicts a system 700 showing an additional example of operation of the facial expression module 108 in greater detail. FIG. 8 depicts a procedure 800 in an example implementation in which a three dimensional facial expression 112 is generated using a nonlinear technique from a blend shape 116 and a facial expression source 122. In the following, the discussion interchangeably refers to both figures.

Figure 10:
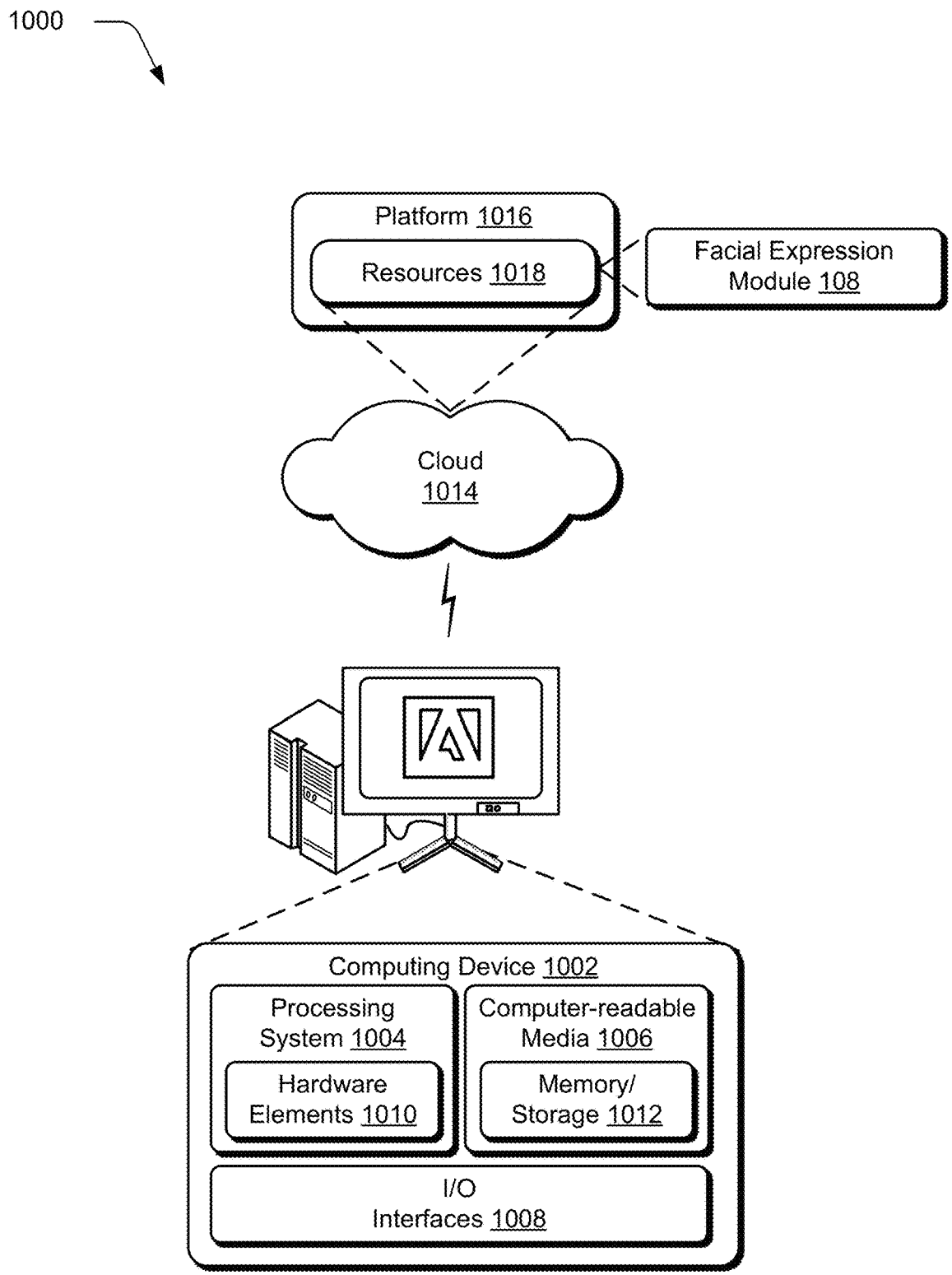
FIG. 10 illustrates an example system including various components of an example device that can be implemented as any type of computing device as described and/or utilize with reference to FIGS. 1-9 to implement embodiments of the techniques described herein.

Aspects of the procedure may be implemented in hardware, firmware, software, or a combination thereof as further described in relation to FIG. 10. The procedure is shown as a set of blocks that specify operations performed by one or more devices and are not necessarily limited to the orders shown for performing the operations by the respective blocks.

As before, a semantic type detection module 502 is employed to detect a semantic type 504 defining a facial expression of a blend shape 116 (block 802). Examples of semantic types include descriptions of portions of a face used to make the expression, emotions and corresponding portions of the face that express those emotions, and so forth. As before, semantic type detection is performable in a variety of ways, such as through facial recognition, movement detected through comparison of the facial expression source 124 and the blend shape 116, and so forth.

Points are defined on the facial expression source as corresponding to points on the blend shape based on the detected semantic type of the blend shape (block 804). The semantic type 504 in this example is obtained by a point activation module 702. Based on the semantic type 504, the point activation module 702 defines points 704 on the blend shape 116 that are involved in providing the facial expression of the blend shape 116, e.g., smiling mouth, closed, eyes, and so forth. For example, the blend shape 116 may be configured to generate a facial expression as a smile. As such, eye and mouth shape (and to a lesser extent cheeks) define this facial expression. Accordingly, the points are defined in order to preserve semantic meaning of the blend shape 116 as further described below as part of the augmentation. The points 704 are also defined for the facial expression source 122 as corresponding to these points of the blend shape 116.

Non-linear transfer intensities are assigned to the points of the blend shape 116 and the facial expression source 122, respectively, to form respective points of a plurality of points of the three dimensional facial expression 112 (block 806). In one example, an initial transfer intensity computation module 706 is implemented at least partially in hardware to compute initial transfer intensities 712 based on spatial differences between the blend shape 116 and a model 124 of the facial expression source 122. In this way, the initial transfer intensities 708 provide a naïve initial transfer.

The initial transfer intensities 708 are then provided to a transfer augmentation module 710 implemented at least partially in hardware to augment the initial transfer intensities 708. This augmentation is performed non-linearly based on a comparison of the points of the facial expression source to respective points of the blend shape 116 to form augmented transfer intensities 712.

For example, the points 704 are previously defined by the point activation module 702 as corresponding to the detected semantic type 504. Accordingly, the points 704 of the blending shape 116 define a goal in the facial expression to be achieved through use of the blend shape 116, e.g., a smile of a mouth, closed eyes, raised eyebrows, and so on. By augmenting the initial transfer intensities 708 to form the augmented transfer intensities 712 based on these points 704, e.g., to align the points of the facial expression source 122 to the points of the blend shape 116. This ensures the goal of the blend shape 116 is achieved in a consistent and realistic manner. A point of the blend shape, for instance, may indicate that the eyes are to be closed. Accordingly, the initial transfer intensities 708 are augmented to ensure that a corresponding point of the facial expression source 122 reaches this goal, e.g., that the eyes are closed.

The three dimensional facial expression 112 is generated from the blend shape 116 and the facial expression source 122 by forming the plurality of points using the assigned non-linear transfer intensities (block 808). For example, the augmented transfer intensities 712 are received by a smoothness computation module 714 that is implemented at least partially in hardware to generate a dense vertex based smoothness factor 716 determined by the detected semantic type 504 of the blend shape 116. The vertices, for instance, may include the points 704 defined by the point activation module 702 and are smoothed using weights as described for the augmented transfer intensities.

A linear equation module 718 then uses this smoothness factor 706 in the computing of a system of linear equations. The system of linear equations is computed in which each vertex in the 3D facial expression 112 is set to attain the augmented transfer intensities 712, while maintaining differential coordinates the same as the model 124 of the facial expression source 122 by augmented using the smoothness factor 716. In other words, for each of the vertices, an optimization is performed to minimize a difference between neighboring vertices in the model 124 of the facial expression source 122 while maximizing movement toward the blend shape 116. Informally, this "keeps things where they should be" from the facial expression source 122 while still achieving movement toward the facial expression of the blend shape 116. This satisfies a number of goals, including a goal in which a speed of a surface of the 3D facial expression 122 is continuously varied between different blend shapes, resulting in pleasing and realistic animations. Another goal is satisfied in which structural integrity of the facial expression source 124 is preserved, e.g., there are no self-intersection, invalid geometries, and so on.

Figure 9:
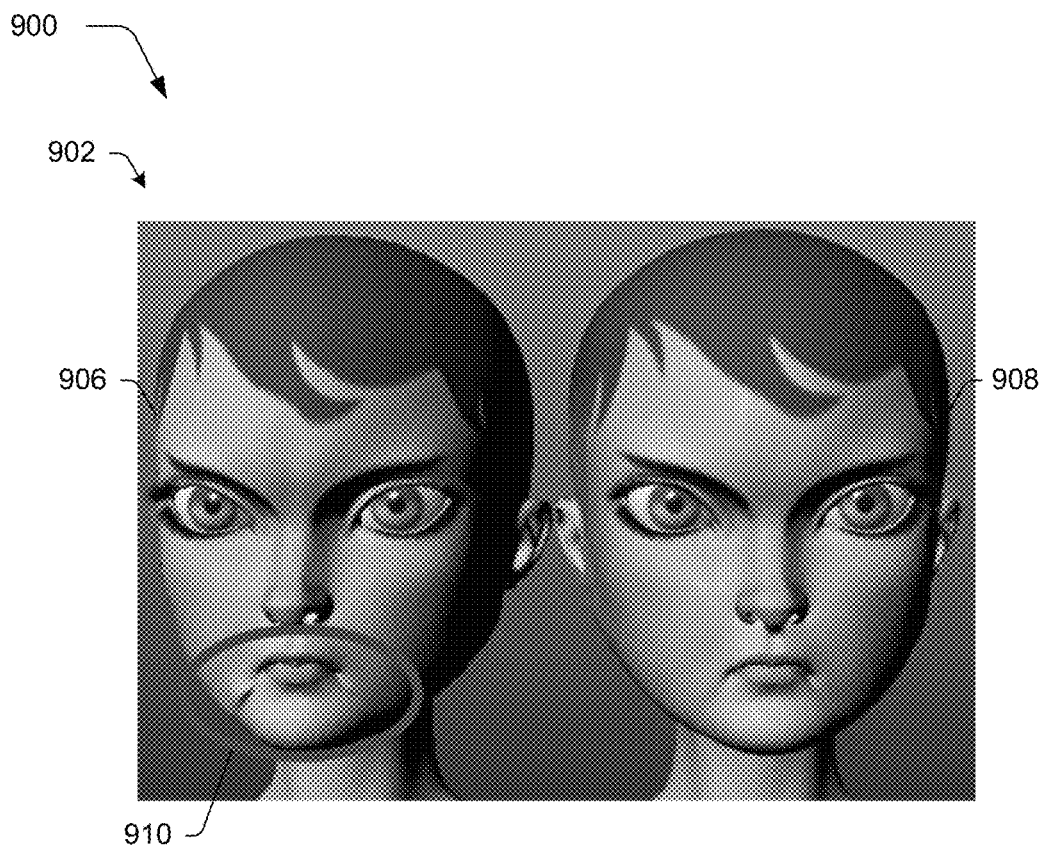
FIG. 9 illustrates an example comparison of a results conventional techniques with the three dimensional facial expression techniques described herein.
Figure 9:
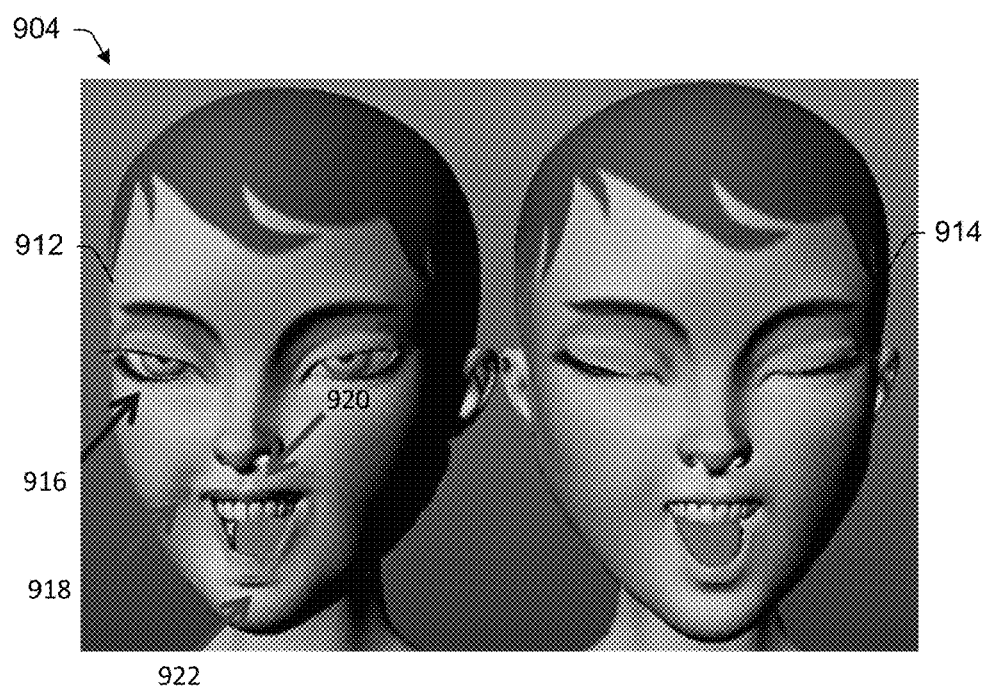

FIG. 9 depicts an example implementation 900 of first and second examples 902 904 of comparison of convention blend shape techniques and techniques that leverage semantic types as described herein. The first example 902 depicts a comparison of a conventional three dimensional facial expression 906 and a three dimensional facial expression 908 generated using the techniques described herein. The conventional three dimensional facial expression 906 includes an artifact 910 around a mouth that includes creases, whereas the three dimensional facial expression 908 generated using the techniques described herein does not. This is because a linear transformation is used conventionally that does not address a semantic type of the facial expression to support a non-linear transform.

The differences become even more apparent in the second example 904 of conventional three dimensional facial expression 912 and a three dimensional facial expression 914 generated using the techniques described herein. As shown in the three dimensional facial expression 914 generated using the current techniques, the eye are complete closed, the mouth is open, and there are no artifacts. However, in the conventional three dimensional facial expression 912, artifacts include half open eyes 916, a facial crease 918, a wrinkled lip 920, and a creased chine 922. This is because the conventional technique it not able to reach the "goal" of the blend shape 116, e.g., completely closed eyes, open mouth), using linear and global transformations.

Example System and Device

FIG. 10 illustrates an example system generally at 1000 that includes an example computing device 1002 that is representative of one or more computing systems and/or devices that may implement the various techniques described herein. This is illustrated through inclusion of the facial expression module 108. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a three dimensional facial expression from a blend shape and a facial expression source, a method implemented by a computing device, the method comprising:
    detecting, by the computing device, a semantic type defining a facial expression of the blend shape;
    assigning, by the computing device, transfer intensities based on the detected semantic type to the blend shape and the facial expression source, respectively, for individual portions of the three dimensional facial expression, the transfer intensities specifying weights given to the blend shape and the facial expression source, respectively, for the individual portions of the three dimensional facial expression; and
    generating, by the computing device, the three dimensional facial expression from the blend shape and the facial expression source based on the assigned transfer intensities.

2. The method as described in claim 1, wherein the detecting of the semantic type includes detecting a change of at least one facial part of the blend shape in comparison to the facial expression source.

3. The method as described in claim 1, further comprising creating, by the computing device, the facial expression source as a model in three-dimensions from a two-dimensional image by using a template and wherein the detecting of the semantic type is performed by comparing the model to the blend shape.

4. The method as described in claim 3, wherein the generating uses the two-dimensional image as a source of texture for the three dimensional facial expression.

5. The method as described in claim 1, further comprising repeating the detecting, the assigning, and the generating for a plurality of said blend shapes using the facial expression source.

6. The method as described in claim 1, wherein the assigning of the transfer intensities is based at least in part on an amount of movement detected for respective said portions from the facial expression source to the blend shape.

7. The method as described in claim 6, wherein the assigning includes assigned increasingly greater amounts of said weight to the blend shape than the facial expression source to a respective said portion in response to increasingly greater detected amounts of the movement for the respective points.

8. The method as described in claim 1, further comprising forming, by the computing device, an animation including the facial expression source as a frame and three dimensional facial expression as another frame.

9. The method as described in claim 8, wherein the forming includes at least one other frame disposed in a sequence in the animation between the frame and the other frame, the at least one other frame formed by blending the facial expression source and the three dimensional facial expression.

10. In a digital medium environment to generate a three dimensional facial expression from a blend shape and a facial expression source, a method implemented by a computing device, the method comprising:
    detecting, by the computing device, a semantic type defining a facial expression of the blend shape;
    defining, by the computing device, points on the facial expression source as corresponding to points on the blend shape based on the detected semantic type of the blend shape;
    assigning, by the computing device, transfer intensities to the points of the blend shape and the facial expression source, respectively, to form respective points of a plurality of points of the three dimensional facial expression, the assigning being nonlinear for the plurality of points, one to another, of the three dimensional facial expression based on the detected semantic type; and
    generating, by the computing device, the three dimensional facial expression from the blend shape and the facial expression source by forming the plurality of points using the assigned non-linear transfer intensities for respective said points of the blend shape and the facial expression source.

11. The method as described in claim 10, wherein the transfer intensities specify weights given to the blend shape and the facial expression source, respectively, for generating individual points of the plurality of points of the three dimensional facial expression.

12. The method as described in claim 10, wherein the assigning of the transfer intensities non-linearly includes:
    computing, by the computing device, an initial said transfer intensity based on spatial differences between the blend shape and a model of the facial expression source; and
    augmenting, by the computing device, the initial said transfer intensity non-linearly based on comparison of the points on the facial expression source to respective said points of the blend shape.

13. The method as described in claim 10, wherein the generating includes computing, by the computing device, a smoothness factor based on vertices of the detected semantic type of the blend shape, the vertices defined at least in part using the points of the of blend shape.

14. The method as described in claim 10, wherein the assigning of the transfer intensities includes optimizing the plurality of points of the three dimensional facial expression by minimizing a difference between neighboring vertices in a mesh formed using the points of the facial expression source and maximizing a closeness to an amount of movement defined through comparison of corresponding said points of the blend shape and the facial expression source.

15. In a digital medium environment to generate a three dimensional facial expression from a blend shape and a facial expression source, a system comprising:
- a semantic type detection module implemented at least partially in hardware to detect a semantic type defining a facial expression of the blend shape;
- a transfer intensity assignment module implemented at least partially in hardware to assign transfer intensities to the blend shape and the facial expression source, respectively, for individual points of the three dimensional facial expression, the assignment based on the detected semantic type; and
- a three dimensional facial expression generation module implemented at least partially in hardware to generate the three dimensional facial expression from the blend shape and the facial expression source based on the assigned transfer intensities.

16. The system as described in claim 15, wherein the semantic type detection module is configured to detect the semantic type by detecting a change at least one facial part of the blend shape in comparison to the facial expression source.

17. The system as described in claim 15, wherein the transfer intensity assignment module is configured to assign the transfer intensities based at least in part on detecting an amount of movement detected for respective points between the blend shape and a model of the facial expression source.

18. The system as described in claim 17, wherein the transfer intensity assignment module is configured to assign the transfer intensities by assigning increasingly greater amounts of said weight to the blend shape than the facial expression source in response to increasingly greater detected amounts of movement for the respective points.

19. The system as described in claim 17, wherein the transfer intensity assignment module is configured to assign the transfer intensities by assigning increasingly lesser amounts of said weight to the blend shape than the facial expression source in response to increasingly lesser detected amounts of the movement for the respective points.

20. The system as described in claim 15, wherein the transfer intensity assignment module is configured to assign the transfer intensities by optimizing a plurality of points of the three dimensional facial expression by minimizing a difference between neighboring vertices in a mesh formed using points of the facial expression source and maximizing a closeness to an amount of movement defined through comparison of corresponding points of the blend shape and the facial expression source.

* * * * *